United States Patent

[11] 3,528,361

| [72] | Inventor | Wayne P. Le Van<br>310 East 44th St., New York, New York 10017 |
|---|---|---|
| [21] | Appl. No. | 413,846 |
| [22] | Filed | Nov. 25, 1964 |
| [45] | Patented | Sept. 15, 1970 |

[54] BACON BROILING APPARATUS
7 Claims, 3 Drawing Figs.

[52] U.S. Cl. .................................................. 99/349,
99/107, 99/386, 99/400, 99/443, 99/389
[51] Int. Cl. ............................................... A47j 37/00
[50] Field of Search ................................... 99/107,
174, 386, 389, 443, 404, 349, 355, 400, 423, 409;
53/392; 198/33(R)1, 165; 100/118, 119, 120,
151—154

[56] References Cited
UNITED STATES PATENTS

| 386,407 | 7/1888 | Kaylor | 100/120X |
| 2,528,832 | 11/1950 | Johnson | 99/174 |
| 2,529,253 | 11/1950 | Hoffman et al. | 99/443X |
| 2,763,110 | 9/1956 | Stuart | 53/392X |
| 2,807,550 | 9/1957 | Zarotschenzeff et al. | 99/174 |
| 3,087,418 | 4/1963 | Albright | 99/386 |
| 3,256,803 | 6/1966 | Nelson | 99/349 |
| 3,280,995 | 10/1966 | Barkley | 99/33X |

*Primary Examiner*—Billy J. Wilhite
*Attorney*—Irving Seidman

ABSTRACT: An apparatus for broiling strips of bacon and the like is disclosed in which the strips are loaded on and unloaded from a moving conveyor while the latter has a substantially horizontal orientation, and are transported through a broiling oven with at least a terminal portion of each strip disposed nearly vertical or in either a 1 o'clock or 11 o'clock position. Thereby, the strips may be heated on both surfaces, as by infrared heating means, while passing through the oven, and the melted fat readily drips off the strips.

Patented Sept. 15, 1970
3,528,361
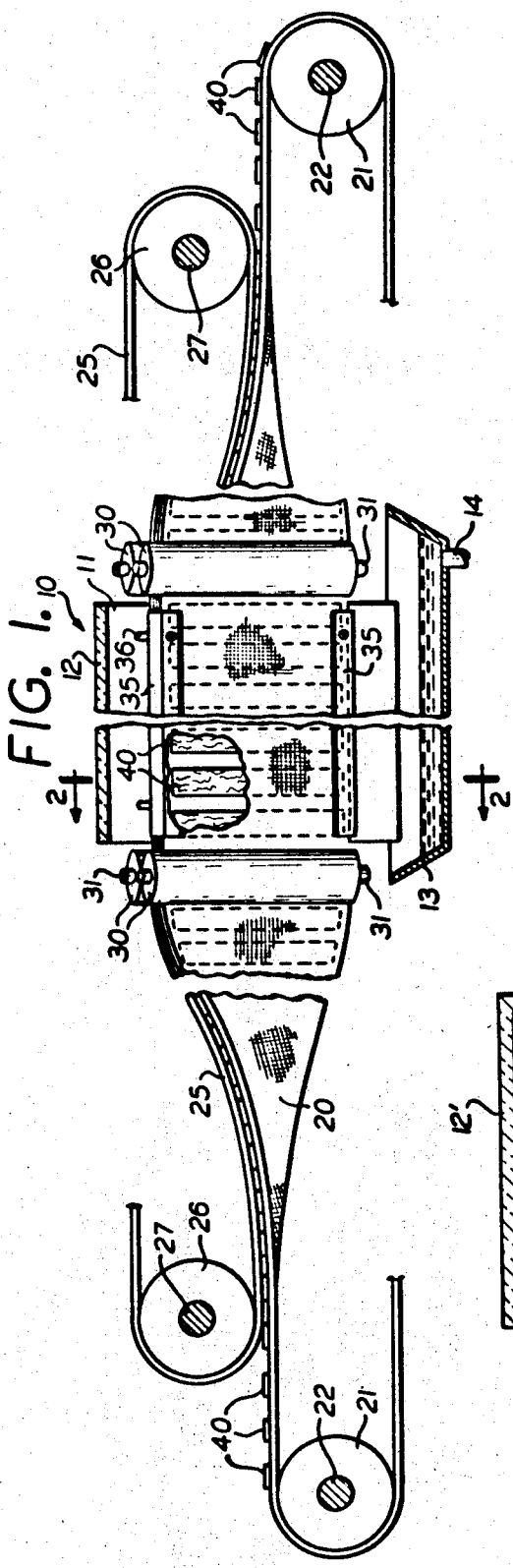
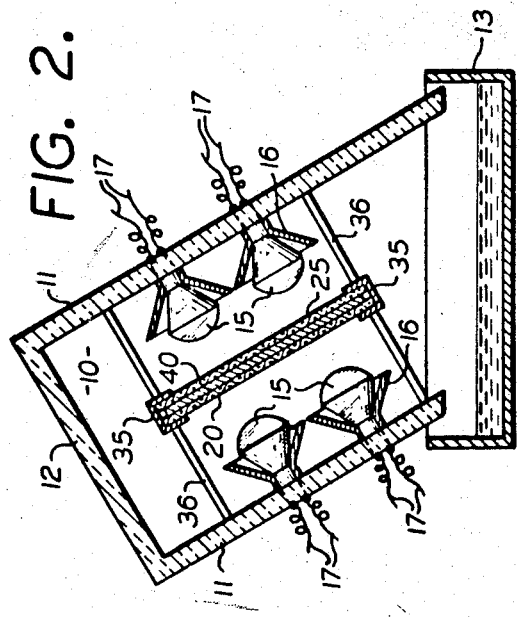
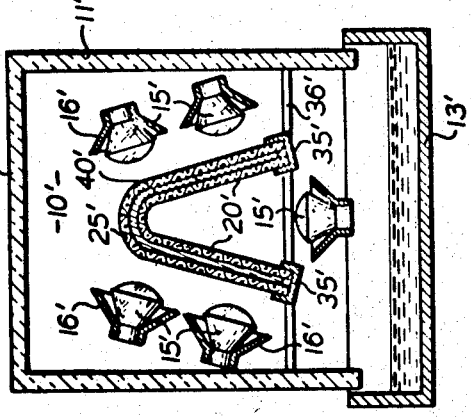
INVENTOR
WAYNE P. LE VAN
BY
*Alfred E. Page*
ATTORNEY.

BACON BROILING APPARATUS

BACKGROUND OF THE INVENTION

This invention relates to broiling and, more particularly, to a novel continuous type broiling apparatus particularly adapted to high speed production of broiled bacon strips and the like.

In Zarotschenzeff et al. U.S. Pat. No. 2,807,550, issued September 24, 1957, there is shown, and described a method of preparing pre-cooked and packaged bacon strips which are made ready for serving merely by dropping a wrapped package, containing several strips of the pre-cooked bacon, into the slot of an ordinary toaster. In accordance with the teachings of said patent, the bacon is broiled for a time sufficient to remove substantially two thirds of the weight thereof, in the form of liquefied fat.

The apparatus disclosed in the Zarotschenzeff et al. patent, shows an endless support conveyor which extends through a broiling oven and which, at the upstream side of the oven, has associated therewith means for delivering strips or slices of bacon to the support conveyor to extend transversely thereacross in substantially uniformly longitudinally spaced relation. The support conveyor carries these bacon strips through the oven at a speed, coordinated with the oven temperature, such that the weight of the bacon is reduced by substantially two-thirds by extraction of fat therefrom. After leaving the oven, the bacon on the conveyor is delivered to means which package the bacon in substantially flat metal foil packages having essentially the configuration of a slice of bread. The thus pre-broiled and packaged bacon may be stored for a relatively long time, and is made ready for use merely by dropping the package into a slot of a toaster.

While the process described in the Zarotschenzeff et al. patent, has been successful in practice, it has been realized that the commercial possibilities thereof could be greatly enhanced if the speed of production of the bacon could be very substantially increased. To obtain a satisfactory product, within the terms of the claims of the Zarotschenzeff et al. patent, requires a relatively slow conveyor movement through the oven, thus cutting down the production time per conveyor unit and per oven. This correspondingly increases the expense of the finished product as well as requiring a considerable capital investment in order to obtain sufficient output for commercial purposes.

In accordance with the present invention, it has been found that a very substantial increase in rate of production of the pre-broiled bacon strips can be effected by so orienting the bacon strip support surfaces of the conveyor means, in the portion thereof passing through the broiling oven, that the support surfaces extend at a relatively small acute angle to the vertical. This results in a much more effective removal of liquefied fat from the bacon and at a very much faster rate, thus greatly increasing the speed with which the bacon is pre-broiled to the desired extent. For example, it has been found in practice that the time of passage of a bacon strip through the oven can be reduced to the order of 90 seconds or less by the apparatus and method of the present invention.

Another object of the invention is to provide an improved apparatus for the mass production of pre-broiled bacon strips.

A further object of the invention is to provide an apparatus for pre-broiling bacon strips, in which the heating time is reduced to a minor fraction of that hitherto required.

Yet another object of the invention is to provide an apparatus for pre-broiling bacon strips involving an endless conveyor on which the bacon strips are transported through a broiling oven, the bacon strip support surface of this conveyor within the oven being inclined laterally at a relatively large acute angle to the horizontal and a relatively small acute angle to the vertical.

Still another object of the invention is to provide apparatus for pre-broiling bacon strips and including a pair of endless conveyors, one being a support conveyor and the other being a pressure conveyor, with these conveyors passing through a broiling oven for transport of the bacon strips therethrough, both conveyors, in their passage through the oven, having their bacon contacting surfaces oriented to extend laterally at a relatively small acute angle to the vertical.

For an understanding of the principles of the invention, reference is made to the following description of typical embodiments thereof as illustrated in the accompanying drawings.

In the drawings:

FIG. 1 is a somewhat schematic side elevation view, partly in section, of apparatus embodying the invention;

FIG. 2 is a section taken on the line 2—2 of FIG. 1; and

FIG. 3 is a view similar to FIG. 2, but illustrating a modified form of the invention.

Referring to FIGS. 1 and 2, apparatus for pre-broiling bacon strips in accordance with the teachings of said Zartoschenzeff et al. patent, is illustrated as including a relatively elongated tunnel-type oven 10 having side walls 11 and a roof 12. Disposed below oven 10 there is a relatively elongated trough or collecting pan 13 for the bacon drippings or melted fat, and which may have a drain 14 by means of which the liquefied fat may be led away to a suitable collection point. In the arrangement illustrated, side walls 11 of oven 10 are indicated as extending at an acute angle to the vertical, but it should be understood that this is exemplary only and the side walls 11 may extend vertically.

While oven 10 may have any desired heating means, such as gas or electric, it is illustrated by way of example as having heating means in the form of infra-red lamps 15 each of which is provided with a reflector 16. There may be as many of these infra-red lamps 15 located alongside walls 11 of oven 10 as may be necessary to obtain the proper oven temperature in accordance with the rate of travel of the bacon strips therethrough. Lamps 15 are illustrated as supplied with operating potentials through conductors 17, shown solely by way of example.

The bacon strips 40 are transported through oven 10 on a support conveyor 20 which is an endless conveyor trained over end rolls 21, 21 which are rotatable about the axes of shafts 22, 22. One or both of the end rolls 21, 21 may be driven. Support conveyor 20 is of the stainless steel mesh or link-type, for adequate resistance to the high temperature conditions in oven 10. In the same manner as illustrated in said Zarotschenzeff et al. patent, bacon is sliced and the individual bacon strips 40 are deposited by suitable means upon the left end of conveyor 20, transported by this conveyor through oven 10 in a manner to be described, and discharged from the right-hand end of the conveyor onto suitable collecting and packaging means for the individual strips, these means being shown somewhat schematically in said Zarotschenzeff et al. patent.

Bacon strips 40 are maintained in firm engagement with support conveyor 20 by means of a pressure conveyor 25 which is an endless conveyor trained over end rolls 26 which are rotatable about the axes of shafts 27. The overall length of pressure conveyor 25 is somewhat less than that of support conveyor 20, as illustrated in FIG. 1. Conveyor 25 has the same construction as conveyor 20, being preferably a stainless steel mesh or link-type conveyor.

In the embodiment of the invention illustrated in FIGS. 1 and 2, the superposed conveyors 20 and 25, with bacon strips 40 compressed therebetween, have their facing surfaces oriented to an acute angle to the vertical throughout these portions of the lengths of these conveyors extending through oven 10. For example, conveyors 20 and 25 may be, in their passage through oven 10, disposed parallel to a plane which is at either the 1 o'clock or 11 o'clock position as viewed from an end of oven 10. This orientation of the conveyor runs, during their passage through oven 10, results in a much more rapid broiling of the bacon strips to the desired condition, namely involving a reduction in weight of about two-thirds by removal of fat in liquid form therefrom.

For the purpose of so orienting conveyors 20 and 25 during their passage through oven 10, cooperating rollers 30 are positioned in engagement with the conveyors 20 and 25 pressed therebetween at the entrance to and exit from oven 10. The axles 31 of rollers 30 extend at the aforementioned acute angle to a vertical plane, or in the 1 o'clock or 11 o'clock positions. Rollers 30 may be supported in any suitable manner, not specifically illustrated in the drawings.

In order to maintain conveyors 20 and 25 in firm engagement with bacon strips 40 during passage of the bacon strips through oven 10, suitable means are provided to guide and compress the conveyors toward each other during their passage through oven 10. As illustrated, such means may comprise reversely facing channels 35, 35 which are supported on suitable cross members 36 extending between side walls 11 of oven 10. Cooperating channels 35 have guiding engagement with the edges of conveyors 20 and 25 and maintain these conveyors in properly compressed relation for clamping or holding bacon strips 40 therebetween.

It will be noted, particularly from FIG. 2, that due to the orientation of side walls 11, 12 and the support of the infra-red lamps 15 thereon, the reflectors 16 direct the infra-red energy perpendicularly or normal to the plane of passage of bacon strips 40 through the oven 10, the heat being directed against the bacon strips through the meshes or interstices of conveyors 20 and 25 by lamps 15 disposed on opposite sides of the two conveyors.

In the operation of the apparatus of the invention in performing the method of the invention, the bacon strips are disposed at relatively uniform distances transversely of support conveyor 20 for passage through the upper run or support surface of support conveyor 20 by the lower run pressure conveyor 25. The linear speed of conveyors 20 and 25 is so selected, in coordination with the length of oven 10 and the temperature therein provided by heating elements 15, that the weight of the bacon strips 40, passing through oven 10 is reduced by substantially two-thirds, the reduction being in the form of liquid or molten fat, during passage of the bacon strips through the oven. As stated, it has been possible with the apparatus of the invention to broil the bacon strips to the desired degree of weight reduction in a total time of 90 seconds, and such time can be even further reduced. This is a very substantial reduction from the time required by using apparatus of the type shown in said Zarotschenzeff et al. patent, and is due primarily to the nearly vertical orientation of the bacon strips during their passage through the oven.

FIG. 3 illustrates an alternative embodiment of the invention in which the support and pressure conveyors, during their passage through the oven, have the configuration of an inverted V. In FIG. 3, parts corresponding to those in FIGS. 1 and 2 have been given the same reference characters primed, and it should be understood that, outside of the oven, the support and pressure conveyors may have essentially the same disposition, support and driving arrangements such as illustrated in FIG. 1.

Referring to FIG. 3, in advance of entering oven 10', support conveyor 20' and pressure conveyor 25' are oriented into an inverted V-shape by suitable means such as, for example, variations of the rollers 30 of FIG. 1. During their passage through the oven 10', the conveyors are maintained in this inverted V arrangement by virtue of their edges being guided in channel-shaped guides 35', 35' supported on support elements 36'. The angular orientation of the two sides of the V corresponds essentially to the angular orientation of the conveyors 20 and 25 as shown in FIG. 2. For example, the inverted V arrangement may be a blunt V arrangement in which the apex of the V may be one cross link of support conveyor 20' and possibly two or three cross links of pressure conveyor 25'. The infra-red lamps 15' are used to broil the bacon during its passage through oven 10' and may have any suitable disposition such as that shown in FIG. 3. Alternatively, two or more infra-red lamps can be positioned within the confines of the inverted blunt V. Otherwise, the arrangement operates as previously described, with the conveyors 20' and 25' being re-oriented to a planar horizontal orientation by suitable exit rollers (not shown) which may correspond to the exit rollers 30 of FIG. 1.

While specific embodiments of the invention have been shown and described in detail to illustrate the application of the principles of the invention, it will be understood that the invention may be embodied otherwise without departing from such principles.

I claim:

1. A broiling apparatus comprising, in combination, a relatively elongated oven having open ends; an endless support conveyor extending through said oven for transporting food items through said oven for broiling, the food support surface of said conveyor, exterior to said oven, extending in a substantially horizontal plane for loading of food items on the conveyor and unloading of food items from the conveyor; guiding means engageable with said conveyor and maintaining a food support surface of that portion thereof within said oven at a relatively small acute angle to a vertical plane, considered laterally of the path of travel of said conveyor; and means cooperable with said support conveyor for maintaining food items on the support surface of the latter.

2. A broiling apparatus comprising, in combination, a relatively elongated oven having open ends; an endless support conveyor extending through said oven for transporting food items through said oven for broiling, the food support surface of said conveyor, exterior to said oven, extending in a substantially horizontal plane for loading of food items on the conveyor and unloading of food items from the conveyor; guiding means engageable with said conveyor and maintaining a food support surface of that portion thereof within said oven at a relatively small acute angle to a vertical plane, considered laterally of the path of travel of said conveyor; means cooperable with said support conveyor for maintaining food items on the support surface of the latter; and heating means in said oven operable simultaneously on both surfaces of food items transported therethrough on said support conveyor.

3. A broiling apparatus, comprising, in combination, a relatively elongated oven having open ends; an endless support conveyor extending through said oven for transporting food items through said oven for broiling, the upper run of said support conveyor constituting a food support surface which, exterior to said oven, extends in a substantially horizontal plane; an endless pressure conveyor superposed on said support conveyor throughout the major portion of the length thereof and extending through said oven, the lower run of said support conveyor extending in spaced closely adjacent relation to the upper run of said support conveyor to compress food items between said conveyors; guiding means engageable with both of said conveyors and effective to tilt both conveyors laterally, while passing through said oven, so that the food engaging surfaces thereof lie in a plane which extends at a relatively small acute angle to a vertical plane including the longitudinal center line of the direction of travel of said conveyors.

4. A broiling apparatus as claimed in claim 3, in which said conveyors are stainless steel mesh-type conveyors; said guiding means comprising channels embracing opposite side edges of said conveyors.

5. A broiling apparatus comprising, in combination, a relatively elongated oven having open ends; an endless support conveyor extending through said oven for transporting food items through said oven for broiling, the upper run of said support conveyor comprising a food support surface which, exterior to said oven, extends in a substantially horizontal plane; an endless pressure conveyor superposed on said support conveyor and extending through the major portion of the length of the latter and through said oven, the lower run of said pressure conveyor extending parallel to the upper run of said support conveyor and spaced a relatively short distance therefrom whereby to compress food items between said two conveyors; and guiding means engageable with the cooperating runs of both conveyors and effective to bend said cooperating runs, during their passage through the oven, about their longitudinal center lines into an inverted V-shape with the V having an apex angle which is a relatively small acute angle and substantially bisected by a vertical plane including the center lines of said conveyor runs.

6. A broiling apparatus, as claimed in claim 5, in which said conveyors are stainless steel link-type conveyors; said guiding means comprising channels embracing opposite edges of the cooperating runs of said conveyors within said oven.

7. A broiling apparatus, as claimed in claim 3, in which the plane of the cooperating runs of the two conveyors within the oven occupy substantially the 11 o'clock position as viewed from one end of said oven.